Feb. 28, 1939. E. VON RETZE ET AL 2,148,846
PROCESS FOR THE SEPARATION OF ALCOHOL FROM THE FIRST RUNNINGS
Filed Feb. 1, 1937
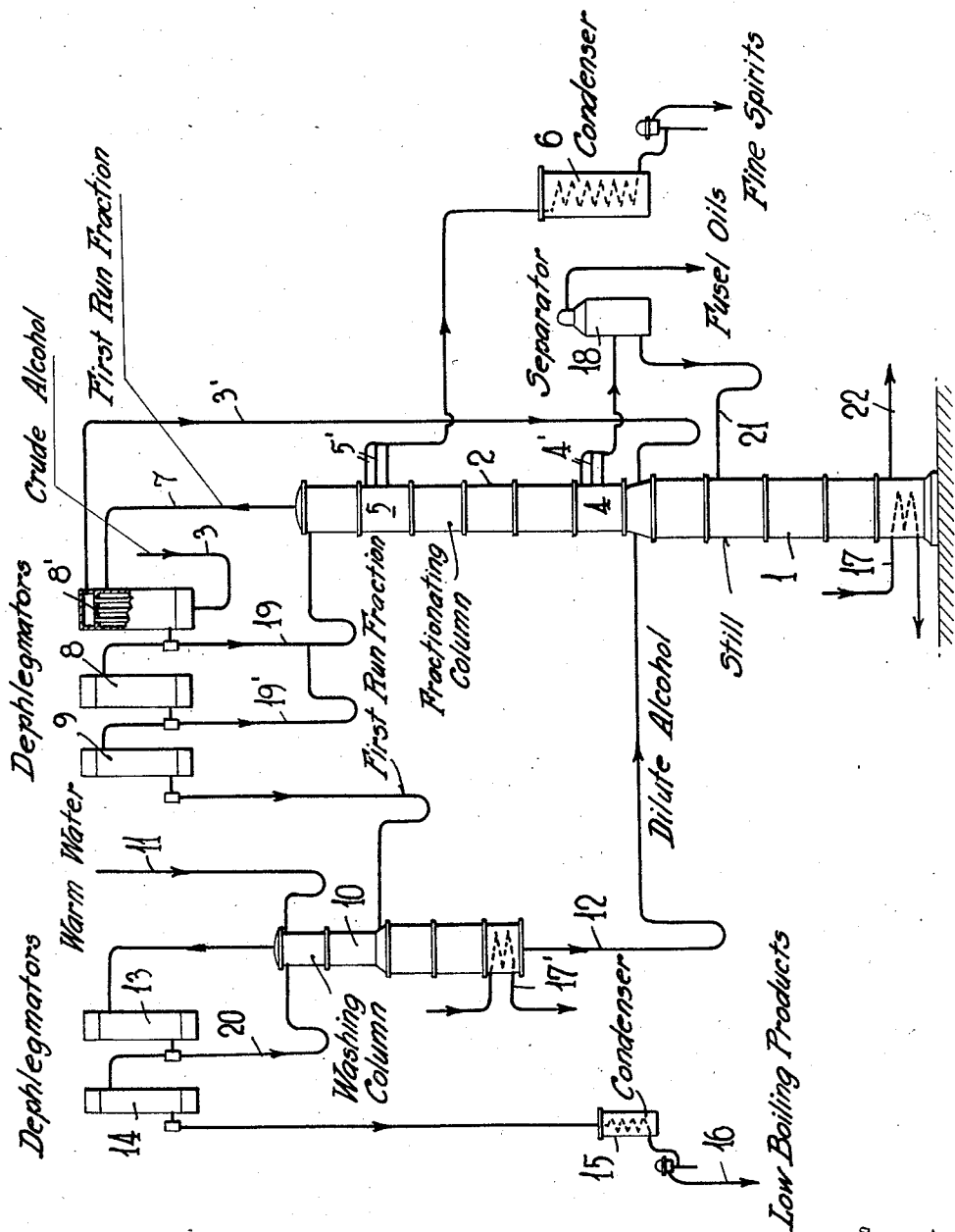
Inventor
Ewald Von Retze,
Friedo Flügge,
By Bailey & Carson
Attorneys Patented Feb. 28, 1939

2,148,846

UNITED STATES PATENT OFFICE 2,148,846

PROCESS FOR THE SEPARATION OF ALCOHOL FROM THE FIRST RUNNINGS

Ewald von Retze, Schoneberg, near Kronberg, and Friedo Flügge, Frankfort-on-the-Main, Germany, assignors to the firm of Deutsche Gold- und Silber Scheideanstalt, vormals Roessler, Frankfort-on-the-Main, Germany Application February 1, 1937, Serial No. 123,514
In Switzerland April 11, 1936

6 Claims. (Cl. 202—40)

This invention relates to improvements in the separation of alcohol from the first runnings obtained in the distillation of alcohol.

It has been found that the acetaldehyde and the other first run products of alcohol distillation processes cannot be separated from the alcohol quantatively by simple distillation, although the acetaldehyde and other first run products have a substantially lower boiling point than alcohol. Experience has shown that it is extremely difficult to separate the lower boiling constituents from the alcohol by distillation since the vapour pressure of the lower boiling constituents such as aldehydes are considerably lowered in the presence of alcohol and for this reason such compounds are retained by the alcohol to a considerable extent. This is particularly true for the last portions of the lower boiling constituents. Therefore, in order to obtain an alcohol of pure flavor it is essential to separate the last portions of the aldehyde completely, and a considerable portion of alcohol must be distilled over in the first run fraction. According to experience, 5 to 10% and even more of the alcohol must be distilled over with the lower boiling products in order to insure complete removal of the aldehydes. This means that a relatively large portion of the alcohol is obtained in a less valuable form.

In the past it has been proposed to facilitate the separation of alcohol from the first run fraction by introducing hot water at the upper part of the alcohol distillation column. However, the results obtainable by such a procedure are limited and it is only possible to reduce the amount of alcohol carried over by the first run fraction to about 5% of the alcohol or slightly less. In this proposed method, dilution of the raw spirit causes prohibitive heat requirements and because of this only relatively poor results could be obtained. Aside from this the proposed method is impractical as the introduction of large quantities of water at the top of the fractionating column renders the separation of the higher alcohols by fractionation impossible.

According to the present invention it is possible to secure substantially complete separation of alcohol from the first run fraction in a very simple manner by first distilling off all the lower boiling products, together with the alcohol carried over thereby and then passing this first run fraction into a separate column wherein the vapours thereof are subjected to countercurrent scrubbing with warm water. The warm water which is supplied to the column is introduced into the upper portion thereof and may be introduced in an atomized condition, if necessary. All of the alcohol is thereby washed out of the first run fraction and the resulting dilute alcohol may then be returned to the distilling column for the concentration of the alcohol thus obtained.

The quantity of water introduced into the washing column may vary within wide limits and generally is proportionate to the quantity of the first run fraction supplied to the column. It has been found advantageous to regulate the quantity of water introduced so that 40 to 70% alcohol solution may be drawn off at the bottom of the column. However, it is possible to operate the process successfully without staying within these limits. Any well known washing apparatus which operates upon the countercurrent principle is applicable to the present process, such as, bubble columns, Raschig columns and the like. However, it is also possible to employ empty columns when the water is introduced in an atomized state into the upper portion thereof. The temperatures of the warm water may range between the boiling point of the lower boiling constituents of the first run fractions and the boiling point of the alcohol. That is, the temperature must be sufficiently high to vaporize the lower boiling constituents but low enough to prevent the alcohol from passing off with the vapours of these products at the top of the column. The temperature of the water, however, must be regulated with a view to other conditions in the washing column as for instance the heat which may be supplied by heat exchange elements in the lower portion thereof and the rate of flow of the first fractions which are introduced into the column and their temperature.

The advantages of the new process reside in the fact that it is possible to separate off substantially one hundred per cent of the lower boiling products while practically all of the alcohol may be converted into fine high grade spirits, and in addition, the new process may be carried out with a very low consumption of heat as the warm water supplied to the washing column may be first still water or water from condensers.

The new process may be carried out advantageously either periodically or continuously. The first run fraction passes off at the upper part of the alcohol distillation column and is introduced into the lower portion of a washing column either as a vapor or as a liquid, while warm water is introduced at the upper portion of the column and cause to flow downwardly and countercurrently to vapours of the first run fraction. The quantity of water introduced into the washundistilled product, and distilling off the alcohol from such product.

5. The process of refining crude spirits which comprises fractionating the crude spirits in a fractionating column, drawing off first run fraction at the head of the fractionating column, drawing off fine spirits below the head of the column, drawing off fusel oils below the point at which the fine spirits are withdrawn, scrubbing the first run fraction while in vaporized form with warm water in a separate column whereby the alcohol carried over in the first run fraction is washed out, drawing off the remaining constituents of the first run fraction in the vapor phase and returning the ensuing dilute alcohol directly to the fractionating column at a point below the above-mentioned points at which the distillation products are withdrawn.

6. In a process as claimed in claim 1, the warm water being supplied in an amount sufficient to produce an alcohol solution of 40% to 70% concentration.

EWALD VON RETZE.
FRIEDO FLÜGGE.